UNITED STATES PATENT OFFICE.

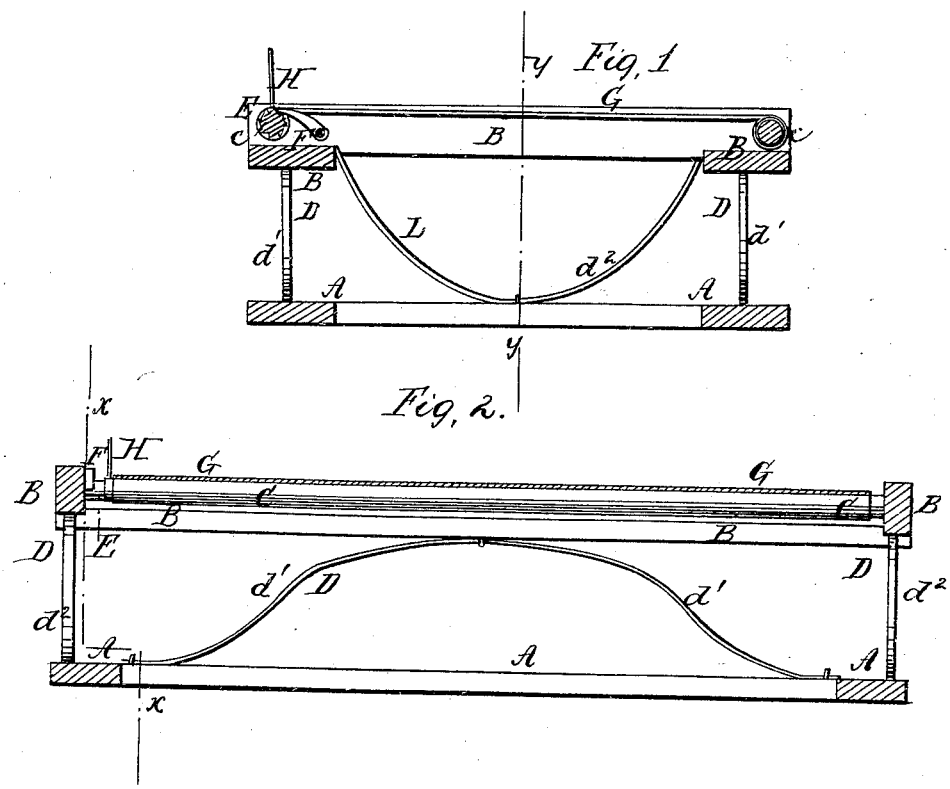

E. M. PAYNE, OF WAVERLY, NEW YORK.

IMPROVED BED-BOTTOM.

Specification forming part of Letters Patent No. 57,181, dated August 14, 1866.

*To all whom it may concern:*

Be it known that I, E. M. PAYNE, of Waverly, Tioga county, State of New York, have invented a new and useful Improvement in Spring Bed-Bottoms; and I do hereby declare that the following is a full, clear, and exact description thereof, which will enable others skilled in the art to make and use the same, reference being had to the accompanying drawings, forming part of this specificaion, in which—

Figure 1 is a cross-section of my improved bed-bottom, taken through the line $x\,x$, Fig. 2. Fig. 2 is a longitudinal section of the same, taken through the line $y\,y$, Fig. 1.

Similar letters of reference indicate like parts.

My invention has for its object to furnish an improved bed-bottom, simple in construction, strong, and durable; and it consists, first, in the combination of the sacking, rollers, pawls, and ratchet-wheels with each other and with the frame of the bed-bottom, for the purpose of straining or tightening the sacking when necessary; second, in the combination of the half-elliptic springs, or equivalent, with the upper and lower frames of the bed-bottom, the whole being constructed and arranged as hereinafter more fully described.

A is the lower frame of the bed-bottom, which is made of two longitudinal and two cross-pieces framed into each other. This frame rests in upon the bedstead in the ordinary manner.

B is the upper frame of the bed-bottom, which is made of two longitudinal and two cross-pieces framed into each other, the end or cross pieces being higher than the side or longitudinal pieces, so as to furnish bearings for the ends of the rollers C. The frame B is supported upon springs D, which rest upon the lower frame, A. These springs are half-elliptic. The side ones, $d'$, are attached at their centers to the center of the side pieces of the upper frame, B, and their ends are secured to the side pieces of the lower frame, A, as shown in Fig. 2. The end springs, $d^2$, are attached at their centers to the end pieces of the lower frame, A, and their ends are inserted in notches or recesses formed for their reception in the end pieces of the upper frame, B, just at the edges of the side pieces of said frame, as shown in Fig. 1. These springs D may be replaced by spiral or other shaped springs, if desired, the form of the springs being immaterial so long as they are placed around the edge of the bed-bottom, between the upper and lower frames, A and B.

The rollers C are placed just above the side pieces of the upper frame, B, and revolve in bearings in the upwardly-projecting parts of the end pieces of said frame B. These rollers C have ratchet-wheels E formed upon or attached to their ends, as shown at E, Figs. 1 and 2, and are held in place by pawls F, pivoted to the end pieces of said frame and working in the teeth of said ratchet-wheels. These rollers may both revolve, or one may be stationary and the other revolve, as may be desired.

The canvas or sacking G is securely attached to the rollers C, and is strained or tightened by revolving one or both of said rollers. This may be done by means of a short lever, H, inserted in holes formed in the rollers C, near their ends, for this purpose.

I claim as new and desire to secure by Letters Patent—

The combination of the half-elliptic springs D with the upper and lower frames, B and A, of the bed-bottom, provided with rollers C, pawl F, ratchet-wheel E, and canvas G, substantially as described, and for the purpose set forth.

E. M. PAYNE.

Witnesses:
M. A. MORSE,
H. HALLET.